United States Patent [19]
Khani

[11] Patent Number: 6,122,405
[45] Date of Patent: Sep. 19, 2000

[54] ADAPTIVE FILTER SELECTION FOR OPTIMAL FEATURE EXTRACTION

[75] Inventor: Dara T. Khani, Marietta, Ga.

[73] Assignee: Martin Marietta Corporation, Bethesda, Md.

[21] Appl. No.: 08/112,535

[22] Filed: Aug. 27, 1993

[51] Int. Cl.⁷ .................................................... G06K 9/40
[52] U.S. Cl. ............................................................. 382/261
[58] Field of Search .................................. 382/16, 18, 19, 382/22, 20, 51, 36, 40, 170, 171, 260, 261; 364/514, 516, 517, 443

[56] References Cited

U.S. PATENT DOCUMENTS

| | | | |
|---|---|---|---|
| 3,921,136 | 11/1975 | Bar-Lev | 382/295 |
| 4,320,287 | 3/1982 | Rawicz . | |
| 4,409,661 | 10/1983 | Romanski . | |
| 4,482,970 | 11/1984 | Barry . | |
| 4,521,861 | 6/1985 | Logan et al. . | |
| 4,633,261 | 12/1986 | Kosaka et al. . | |
| 4,654,811 | 3/1987 | Jakubzick . | |
| 4,783,828 | 11/1988 | Sadjadi | 382/170 |
| 4,796,187 | 1/1989 | North . | |
| 4,849,906 | 7/1989 | Chodos . | |
| 4,855,932 | 8/1989 | Cangiani et al. . | |
| 4,908,872 | 3/1990 | Toriu et al. | 382/197 |
| 4,956,792 | 9/1990 | Sekine . | |
| 4,970,660 | 11/1990 | Marchant . | |
| 5,051,751 | 9/1991 | Gray . | |
| 5,062,056 | 10/1991 | Lo et al. . | |
| 5,063,524 | 11/1991 | Ferre et al. . | |
| 5,073,958 | 12/1991 | Imme | 382/267 |
| 5,074,673 | 12/1991 | Sowell et al. | 382/225 |
| 5,115,477 | 5/1992 | Groezinger | 382/199 |
| 5,142,590 | 8/1992 | Carpenter et al. | 382/157 |
| 5,253,765 | 10/1993 | Moorehead et al. | 382/286 |

OTHER PUBLICATIONS

Gonzalez et al, "Digital Image Processing", 1992, Addison-Wesley, pp. 559–560.
Rafael C. Gonzalez, *Digital Image Processing*, Second Edition, pp. 33–36 (1987);.
William O. Nicholson and Kenneth S. Davis, "The Binomial Window", *Image Processing for Missile Guidance*, vol. 238, pp. 467–479 (1980).
J.T. Tou and R.C. Gonzales, *Pattern Recognition Principles*, pp. 86–97 (1974).

*Primary Examiner*—Jon Chang
*Attorney, Agent, or Firm*—Burns, Doane, Swecker & Mathis, LLP

[57] ABSTRACT

A method for analyzing a region of interest in an original image to extract at least one robust feature, including the steps of passing signals representing the original image through a first filter to obtain signals representing a smoothed image, performing a profile analysis on the signals representing the smoothed image to determine a signal representing a size value for any feature in the original image, performing a cluster analysis on the signals representing the size values determined by the profile analysis to determine a signal representing a most frequently occurring size, selecting an optimal filter based on the determined signal representing the most frequently occurring size, and passing the signals representing the original image through the optimal filter to obtain an optimally filtered image having an optimally high signal-to-noise ratio. An apparatus for analyzing a region of interest in an image to extract robust features is also provided.

26 Claims, 10 Drawing Sheets

$I(i,j)$

| 0 | 255 | 255 | 255 | 255 | 0 |

FIG. 6A

RAMPUP

| 0 | 1 | 0 | 0 | 0 | 0 |

FIG. 6B

RAMPDOWN

| 0 | 0 | 0 | 0 | 0 | 1 |

FIG. 6C $I(i,j)$

| 240 | 255 | 250 | 245 | 200 | 200 | 220 | 215 | 210 | 209 | 180 | 181 |

FIG. 6D

RAMPUP

| 0 | 1 | 0 | 0 | 0 | 0 | 1 | 0 | 0 | 0 | 0 |

FIG. 6E

RAMPDOWN

| 0 | 0 | 0 | 0 | 1 | 0 | 0 | 0 | 0 | 1 | 0 |

FIG. 6F $I(i,j)$

| 210 | 230 | 225 | 220 | 221 | 225 | 255 | 250 | 235 | 241 | 245 | 175 |

FIG. 6G

RAMPUP

| 0 | 1 | 0 | 0 | 0 | 0 | 1 | 0 | 0 | 0 | 0 | 0 |

FIG. 6H

RAMPDOWN

| 0 | 0 | 0 | 0 | 0 | 0 | 0 | 0 | 1 | 0 | 0 | 1 |

FIG. 6I

ADAPTIVE FILTER SELECTION FOR OPTIMAL FEATURE EXTRACTION

This invention was made with Government support under Contract No. DAAH01-89-C-A012 awarded by the United States Army Missile Command. The Government has certain rights in this invention.

BACKGROUND OF THE INVENTION

The present invention relates to target tracking, and more particularly, to a method and apparatus for extracting robust, prominent features for target tracking.

Target tracking procedures are known in a variety of applications, including robot control, aircraft navigation systems, and missile guidance systems. Typically, an image is formed using an imaging system such as a forward looking infra-red camera, a radar system, or the like. This image contains a variable amount of noise which makes the task of target tracking more difficult.

Some of these prior art methods use two non-adaptive filters successively applied to increase the signal-to-noise ratio of the image and extract robust, prominent features from the scene. When two filters are utilized to extract robust features, the filters are chosen without regard to the characteristics of features present in the scene being imaged. In other words, there is no effort to select the filter parameters so they are optimal (i.e., result in the greatest increase of the signal-to-noise ratio) for a scene having particular characteristics. This may result in features having a signal-to-noise ratio which is lower than necessary. Additionally, the extracted features are likely to be unstable, that is, shift with time as an artifact of an inefficient filtering process, causing errors in the target tracking operations.

For example, U.S. Pat. No. 4,482,970 to Barry discloses a Boolean filtering method and apparatus for filtering noise in an image for target detection. Another method of discriminating noise from the target is disclosed in U.S. Pat. No. 4,956,792 to Sekine. However, in the systems of both of these patents, the same filter is used regardless of the target image. This can cause very unstable features to be selected for tracking.

Adaptive filters for use in aircraft navigation systems are also known. U.S. Pat. No. 4,654,811 to Jakubzick discloses an adaptive filter used on radar signals to reduce noise. The filter constant is changed depending on how far the aircraft is from the transmitting station. Thus, the Jakubzick system, varies the filter constant based upon distance information and not based on characteristics of the scene being imaged.

SUMMARY OF THE INVENTION

The present invention is a system for improved data extraction from an image wherein the parameters of a filter to be used in extracting data are optimized in accordance with determined characteristics of the image. In other words, the filter is chosen that is best for the particular type of image presented to the system. This permits superior and more reliable data extraction.

According to a preferred embodiment of the present invention, a method of analyzing a region of interest in an original image extract at least one robust feature, comprising the steps of passing signals representing the original image through a first filter to obtain signals representing a smoothed image, performing a profile analysis on the signals representing the smoothed image to determine a signal representing a size value for any feature in the original image, performing a cluster analysis on the signals representing the size values determined by the profile analysis to determine a signal representing a most frequently occurring size value, selecting an optimal filter based on the determined signal representing the most frequently occurring size value, and passing the signals representing the original image through the optimal filter to obtain signals representing an optimally filtered image having an optimally high signal-to-noise ratio.

The step of performing a profile analysis comprises performing, for every column and row of pixels in the region of interest in the signals representing the smoothed image, the steps of identifying a starting point for a feature in the region of interest, identifying an ending point for a feature in the region of interest, pairing the identified starting point with the identified ending point, and determining the size value of each feature by subtracting a position of the paired starting point from a position of the paired ending point.

A starting point is identified for a pixel in the signals representing the smoothed image where the intensity of the pixel is greater than the intensity of an immediately previous pixel plus a predetermined threshold and the immediately previous pixel was not identified as a starting point. An ending point is identified for a pixel in the signals representing the smoothed image where the intensity of the pixel is less than the intensity of an immediately previous pixel minus a predetermined threshold and the immediately previous pixel was not identified as an ending point.

The step of performing a cluster analysis comprises the steps of determining an average size value for each cluster in the region of interest and a number of members in each cluster. If the clusters having the largest and second largest number of members have less than a predetermined number of members, setting an optimal size equal to the average size value of the cluster having the largest number of members divided by 2.5. If the clusters having the largest and second largest number of members have more than one less than the predetermined number of members and the average size value of the cluster having the largest number of members is less than or equal to the average size value of the cluster having the second largest number of members, setting an optimal size equal to the average size value of the cluster having the largest number of members divided by 2.5. If the clusters having the largest and second largest number of members have more than one less than the predetermined number of members and the average size value of the cluster having the largest number of members is greater than the average size value of the cluster having the second largest number of members, setting an optimal size equal to the average size value of the cluster having the second largest number of members divided by 2.5.

According to a preferred embodiment of the present invention, an apparatus is provided for analyzing a region of interest in an original image to extract robust features, comprising first filter means for filtering signals representing the original image to obtain signals representing a smoothed image, means for performing an intensity profile analysis on the signals representing the smoothed image to determine a signal representing a size value for any feature in the smoothed image, means for performing a cluster analysis on the signals representing the size values determined by the means for performing a profile analysis to determine a signal representing a most frequently occurring size value, and second filter means for optimally filtering the signals representing the original image based on the determined signal representing the most frequently occurring size value.

An apparatus is provided according to a preferred embodiment of the present invention for operating a microprocessor means to analyze a region of interest in a video image to extract robust features in the video image. The apparatus includes a first module for filtering the signals representing the video image to obtain signals representing a smoothed image, a second module for performing a profile analysis on the signals representing the smoothed image to determine a size value for each of the features in smoothed image, a third module for performing a cluster analysis on the size values determined by the second module to determine the most frequently occurring size value, and a fourth module for optimally filtering the signals representing the original image based on the determined most frequently occurring size.

According to a preferred embodiment of the present invention, a method is provided which includes the steps of obtaining the image, obtaining a data set from said image, each of the members of said data set having a value representing intensity of a pixel of said image, passing the data set through a first filter to obtain a smoothed data set, performing a profile analysis on the smoothed data set to determine size values for at least one feature in said image, performing a cluster analysis on the size values determined by the profile analysis to determine a most frequently occurring size, and using the determined most frequently occurring size to select an optimal filter.

Still other objects, features and attendant advantages of the present invention will become apparent to those skilled in the art from a reading of the following detailed description of the embodiments constructed in accordance therewith, taken in conjunction with the accompanying drawings.

BRIEF DESCRIPTION OF THE DRAWINGS

The invention of the present application will now be described in more detail with reference to the preferred embodiments of the device, given only by way of example, and with reference to the accompanying drawings, in which:

FIGS. 6A–6I illustrate examples of intensity profiles, and RampUp and RampDown arrays for use in describing a preferred embodiment of the present invention;

FIGS. 9A and 9B illustrate binomial band pass filters of order 4 and 8, respectively.

GENERAL DESCRIPTION OF THE INVENTION

Figure 1:
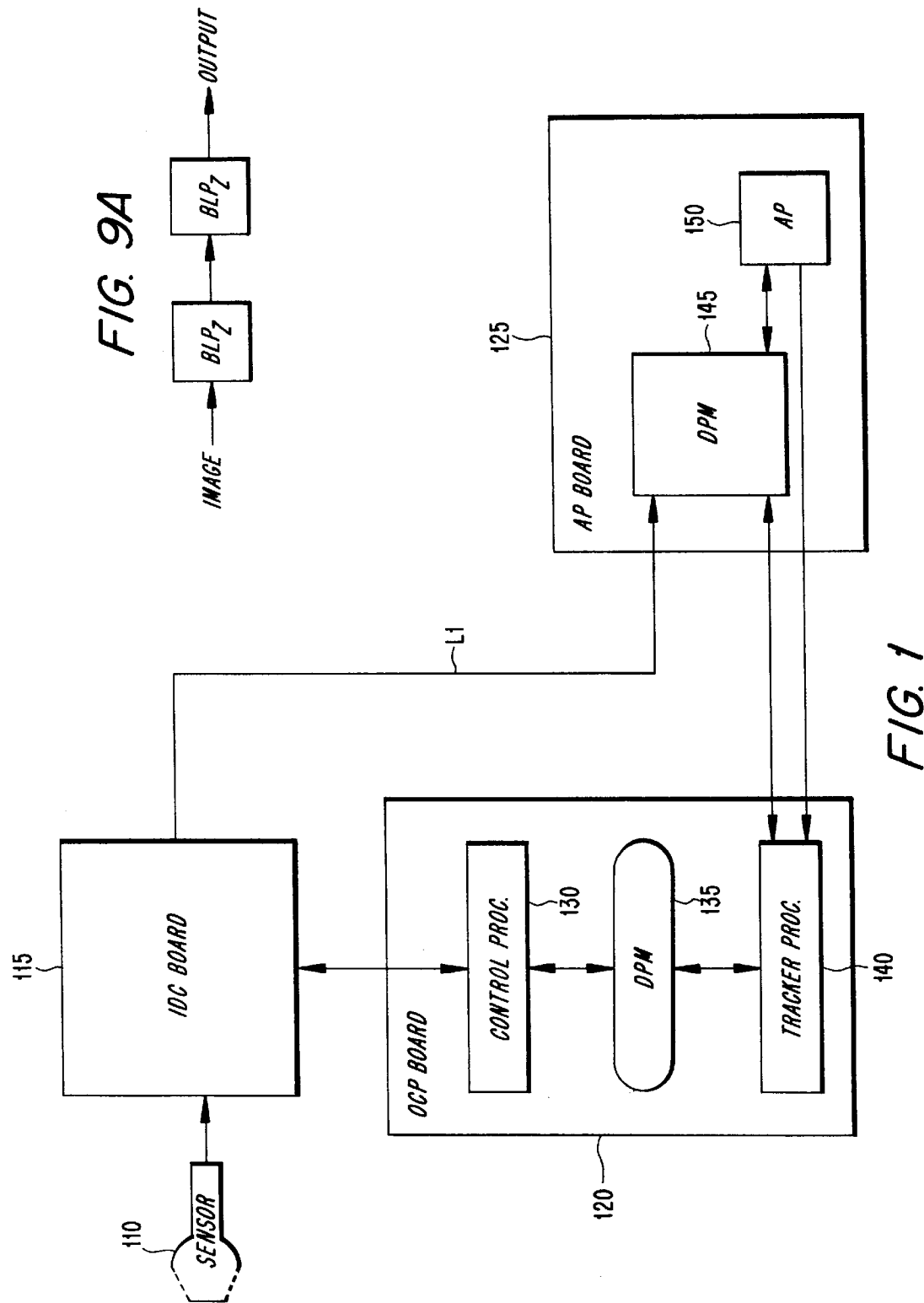
FIG. 1 is a block diagram illustrating of a hardware system on which the above described preferred embodiment can be implemented.

The present invention relates to a method and apparatus for determining the optimal binomial band-pass filter to use for extracting robust features. As mentioned above, the system of the present invention is particularly useful in a wide range of applications, including machine vision, navigation systems and target tracking. Therefore, while the following description is in terms of target tracking for purposes of correctness, it will be understood by one having ordinary skill in the art that the invention is not limited to this application.

For purposes of this description, a filter is optimal if it results in an image having features with a relatively high signal-to-noise ratio and high stability from one frame to another. The use of an optimal filter results in an improved target tracking system.

According to a preferred embodiment, an image is obtained of a region of interest. The region of interest may be the entire field of view or just some part of it. The image is converted into digital signals using known techniques. The digital signals represent the intensity of each pixel which make up the image. For purposes of this description, reference to an image may be made interchangeably with reference to the digital signals representing the image. The signals representing this image are analyzed using an intensity profile analysis to determine the size of the target features within the region. The size of the target features are utilized to select the optimal filter. This method increases the stability of the extracted features and decreases the minimum trackable signal-to-noise ratio.

For purposes of this description and according to a preferred embodiment of the present invention, it is assumed that the image consists of light targets on a dark background. It is understood that the image may be inverted. The adaptation to the described embodiment for use in connection with dark targets on a light background is considered to be within the skill of the ordinary artisan once in possession of the present description and so will not be further described herein.

As a first step, the signals representing the input video image is passed through a preliminary filter to smooth and blur the image. The smoothing process is necessary because of the noisy nature of the input image. Next, an image profile analysis is performed on the signals representing the smoothed image to determine the size of all of the regions, or features, that make up the region of interest. The intensity profile analysis assumes that the features that make up the region of interest are basically small hills and valleys. Hence, by looking at the profile, that is, cross-section, of these hills and valleys, their corresponding size can be determined.

The output of the intensity profile analysis is a set of points that are called, according to a preferred embodiment, ramp up and ramp down points. The ramp up and ramp down points for each profile are analyzed to determine the best pairing of ramp up and ramp down points most likely to correspond to edges of the same feature. The size of the region is equal to the distance between paired ramp up and ramp down points.

Next, a cluster analysis is performed on all the region sizes that were calculated by the X and Y direction profile analysis to determine the most frequently occurring region size. The most frequently occurring region size is then used to select an optimal binomial band-pass filter. The original image is then processed using this optimal filter.

If no features are found in a particular region of interest, and if a previous region of interest was analyzed so as to result in the selection of an optimal filter, that previously selected optimal filter is used for the region of interest in which no features were found. If there was no previously selected optimal filter, for example, where the first region of interest scanned after the tracker apparatus according to the present invention is turned on, an error is signalled and the tracker is moved to a new region of interest.

One advantage resulting from the present invention is that processing an image using a filter which is selected based on the size of the features occurring in the image results in an image having features with a relatively high signal-to-noise ratio and relatively high stability from one frame to another.

DETAILED DESCRIPTION OF THE PREFERRED EMBODIMENTS

FIG. 1 illustrates a block diagram of a hardware system on which the above described preferred embodiment can be implemented. The image is input into the system by sensor 110. Sensor 110 can be implemented using any known imaging system. One possibility of an imaging system that can be used is a forward looking infra-red image camera. The image is passed to an image digitization and correction board, IDC board 115. The IDC board 115 includes an analog-to-digital converter which converts the analog image signals into digital signals representing the original image. The signals representing the original image are passed, through line L1, to the array processor, AP board 125, via a dual port memory DPM 145. The camera's gain and level settings are monitored and controlled by the OCP board 120 through the IDC board 115.

In a preferred embodiment, the AP board 125 acts as a slave processor to the master OCP board 120. The OCP board 120 thus instructs the AP board 125 to perform pixel level image processing operations for target tracking. The results of the operations of the individual tasks performed by the AP board 125 are stored in the DPM 145 for retrieval by the OCP board 120.

The OCP board 120 includes three main elements, a control processor 130, a dual port memory DPM 135, and a tracker processor 140. The control processor 130 and the tracker processor 140 are preferably implemented as 1750A microprocessors, according to a presently preferred embodiment of the present invention. The result of any pixel level operations are passed via the DPM 145 to the tracker processor 140.

Figure 2:
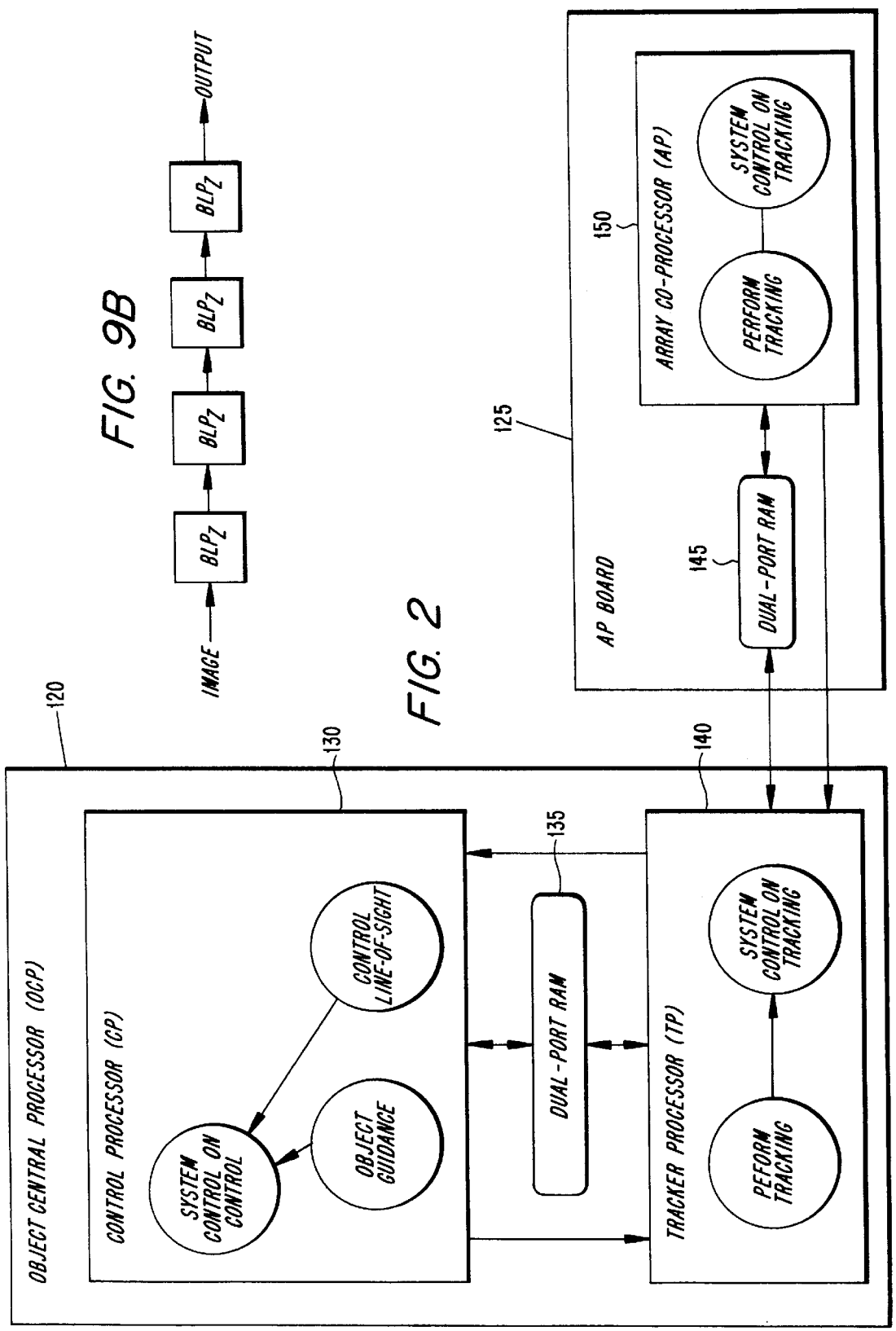
FIG. 2 is a block diagram showing one possible embodiment of the OCP Board 120 and the AP Board 125 of FIG. 1.

FIG. 2 is a block diagram showing one possible embodiment of the OCP board 120 and the AP board 125.

The control processor CP 130 of the OCP board 120 gathers, monitors, processes, and controls every aspect of the tracking system as a whole. The CLS module performs line-of-sight (LOS) control. The LOS is the path that needs to be taken which at the time of calculation will result in the interception of the object being tracked. The LOS is calculated based on the velocity of the object being tracked, the velocity of the tracking system, the distance to the object being tracked, and the relative position of the object being tracked to the tracking system. The OG module performs object guidance, that is, provides the necessary signals to the hardware to control the movements of the tracking system. The signals are all based on the calculations of the CLS and the tracker processor. The SCC module performs system control on all the control tasks. The SCC gathers all the data from the other modules and then performs the necessary tasks to keep the tracking system stable and locked on the target. According to a preferred embodiment, these modules can be implemented in software.

The tracker processor TP 140 of the master OCP board 120 utilizes the results of the tasks it instructed the AP board 125 to perform along with previous data to determine the position of the object being tracked. The PTK module controls the performance of the actual tracking of the target in the image. It constantly fine tunes the tracking parameters to keep the tracking system locked on only the target. The SCT module controls the performance of the system control on the tracker. The SCT coordinates, monitors, controls, and passes data between the TP 140, CP 130, and AP 125 boards.

The dual port memory 135, consisting of, for example, RAM, stores the data being processed by the CP 130 and the TP 140. The array co-processor 150 is a board designed to perform basic image processing operations at the pixel level. Any operation used in the tracker that manipulates the actual image, such as convolving the image or averaging the pixel intensities, is done by the AP 150. This board is available as an off-the-shelf item or can be designed by one skilled in the art.

Figure 3:
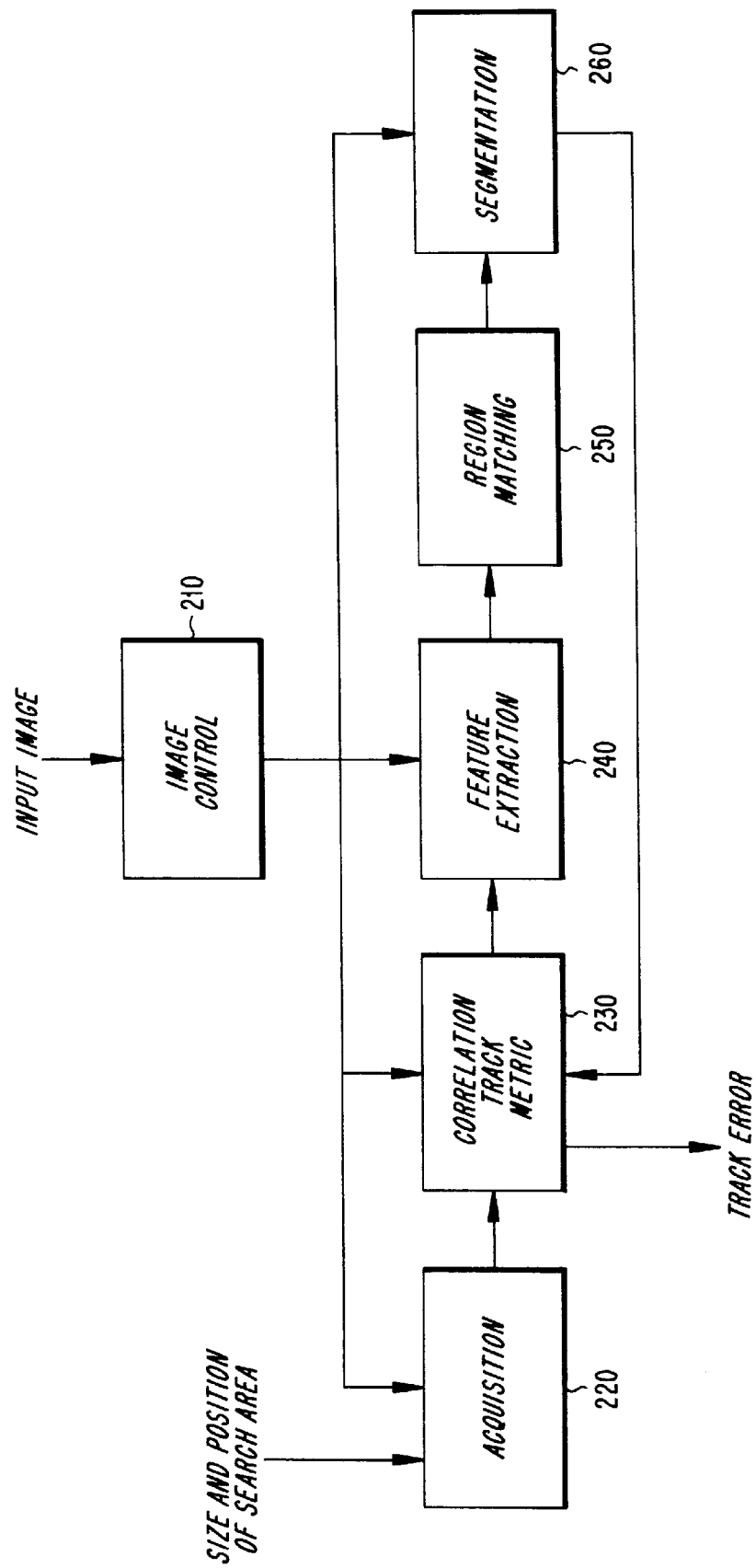
FIG. 3 is a block diagram representing the modules used for performing target tracking operations including the feature extraction procedure according to the present invention.

FIG. 3 is a block diagram showing the modules for performing the target tracking operation. These modules are implemented in the tracker processor TP 140 and the AP board 125. The input into the tracking operation includes the signals representing the original input image and the size and position of the search area. Each of the modules, acquisition 220, correlation track metric 230, region matching 250, segmentation 260, and image control 210, are known modules in target tracking algorithms.

The image control module 210 monitors, controls, and corrects the input image gain and level settings. The objective of the acquisition module 220 is to separate the target from the background given a priori information. The a priori information in this case is size and position of the search area. The correlation track metric module 230 performs a correlation between the last image and the new image to determine the relative difference in position of the target from one frame to the next. The output is referred to as the track error, that is the target's movement measured in pixels. The feature extraction module 240 extracts prominent and robust features from the target and its surroundings. The region matching module 250 matches the new features from module 240 to the previously tracked features, in turn, tracking every feature from one frame to the next. The task of the segmentation module 260 is to segment all the target from the background.

According to a preferred embodiment the present invention is implemented in the feature extraction module 240. The data representing the features that are extracted according to the preferred embodiment of the present invention are then sent to the procedures for tracking the targets, i.e., the tracker processor 140.

According to a preferred embodiment of the present invention, the target tracking is performed for a scene which is pictured using a image recorder of some type. The image is processed in the IDC board 115 to obtain a map of digital signals having assigned values between 0 and 255 representing the intensity of each pixel in the region of interest, or target gate in a known manner. This map is further processed in accordance with a preferred embodiment of the present invention as follows.

Figure 4:
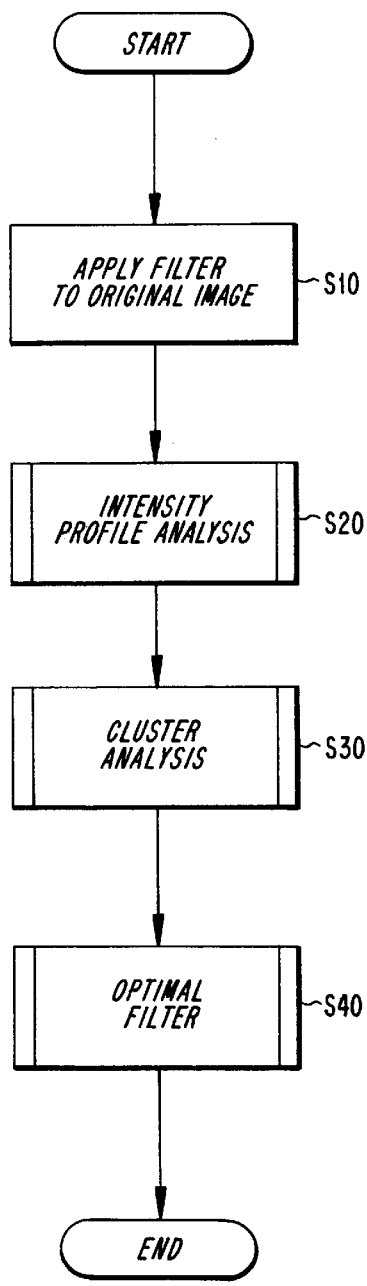
FIG. 4 is a flowchart illustrating a software routine implementing a preferred embodiment of the present invention.

FIG. 4 is a flowchart illustrating a preferred embodiment of the present invention. At step S10, a preliminary filter is applied to the signals representing the intensity map of the original video image to smooth the image and reduce the noise. The signals representing the smoothed, filtered image are passed to the intensity profile analysis routine (step S20). The intensity profile analysis routine outputs and stores signals representing the sizes of each feature found in the image into an array in memory. The size of the feature is equal to the distance between (i.e., difference between the positions of) paired ramp up and ramp down points. The signals representing the sizes are passed to the cluster analysis routine (step S30). The output of the cluster analysis routine is a signal representing the size value of the most frequently occurring feature size in the image. This size value is passed to the optimal filter routine (step S40). This optimal filter routine then selects an optimal binomial band pass filter as the filter to be applied to the original image, based on the most frequently occurring feature size in the region of interest.

According to a preferred embodiment, a second order binomial low pass filter is used in step S10 of FIG. 4. A two-dimensional implementation of the binomial low pass filter BLP is shown in Table 1. The mask shown in Table I is convolved with the original image to smooth the original image. This type of operation is described by Nicholson in "The Binomial Window", *Image Processing for Missile Guidance,* Vol. 238, pp. 467–79 (1980), incorporated herein by reference. Other filters may also be used, for example, an approximation of Gaussian or a 3×3 mean filter.

TABLE 1

|      |   |   |   |
|------|---|---|---|
| 1/16 | 1 | 2 | 1 |
|      | 2 | 4 | 2 |
|      | 1 | 2 | 1 |

The second order binomial low pass filter can also be carried out in two one-dimensional operations. First, the signals representing the original image are convolved in the X direction with the operator or mask shown in Table 2, which shows a one dimensional implementation of the second order BLP filter in the X direction. Such an operation is described in Gonzalez, *Digital Image Processing,* 2nd Ed., pp. 33–36 (1987), incorporated herein by reference. The signals representing the resulting image are then convolved in the Y direction with the operator or mask shown in Table 3, which shows a one dimensional implementation of the second order BLP in the Y direction.

TABLE 2

| ¼ | 1 | 2 | 1 |
|---|---|---|---|

TABLE 3

| ¼ | 1 |
|---|---|
|   | 2 |
|   | 1 |

Figure 5A:
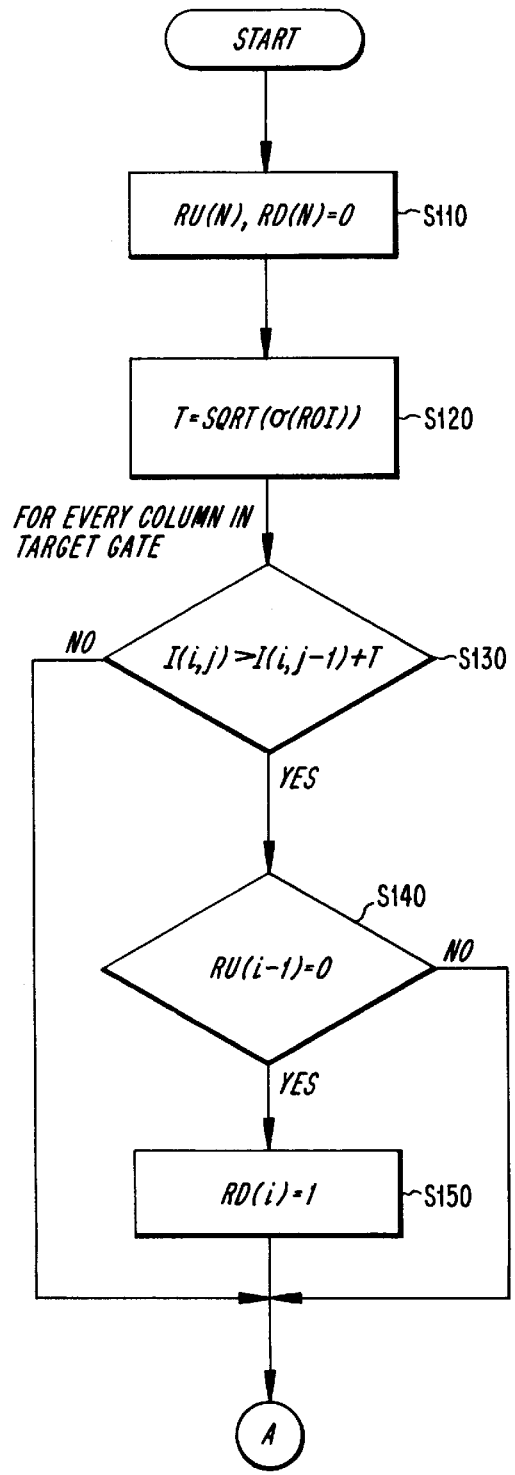
FIGS. 5A and 5B are flowcharts illustrating the intensity profile analysis subroutine according to a preferred embodiment of the present invention.
Figure 5B:
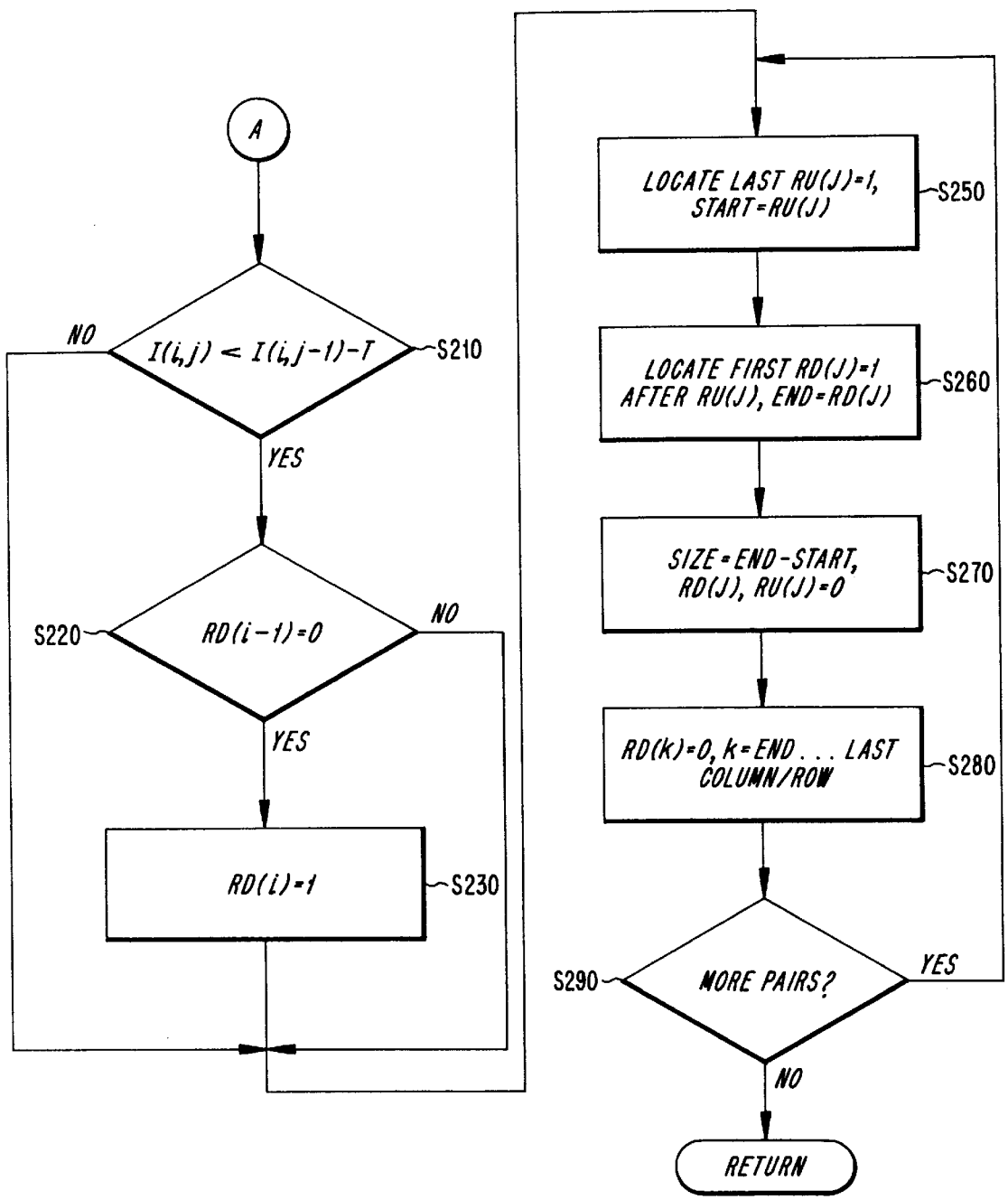

FIGS. 5A and 5B are flowcharts illustrating the intensity profile analysis routine S20 according to a preferred embodiment of the present invention. The purpose of the intensity profile analysis is to determine the size of the regions or features that make up the region of interest (ROI). Each region can be thought of as hills and valleys with varying slopes. Therefore, if the profile (cross section) of each region is analyzed, one can determine the start and stop of the hills and valleys.

For purposes of the following discussion, with reference to the figures, i refers to the $i^{th}$ row of pixels in the video image and j refers to the $j^{th}$ column of pixels in the video image. The threshold T is set as $\sqrt{(\sigma(ROI))}$, where $\sigma(ROI)$ is the standard deviation of the region of interest in the smoothed image coming out of step S10. The threshold is used to determine whether a particular pixel is the start or end of a hill or valley. If the intensity of the next pixel is greater than the intensity of the current pixel by at least an amount equal to the threshold, it is assumed that the current pixel is the start of a hill. Correspondingly, if the intensity of the next pixel is less than the intensity of the current pixel by at least an amount equal to the threshold, it is assumed that the current pixel is the start of a valley.

The signal representing intensity of the smoothed image at pixel (i,j) is stored in I(i,j). RU[N] is an array which stores the position of each ramp up, that is, the start of a hill or valley. RD[N] is an array which stores the position of each ramp down, that is, the end of a hill or valley. The counter N has as a maximum the number of rows or columns in the region of interest.

The intensity profile analysis routine is described with reference to FIGS. 5A and 5B. The following pseudo code describes the program implementing the method shown in FIGS. 5A and 5B.

```
Set RampUp[x],RampDown[x] to 0
Do for every column in the ROI:
    If ( I(i,j) > (I(i,j-1) + Threshold)) {
        if (RampUp[i-1] == 0)
            RampUp[i] = 1      ;start of ramp up, else
                               ;continuation of ramp up
    }
    If ( I(i,j) < (l(i,j-1) - Threshold)) {
        if (RampDown[i-1] == 0)
            RampDown[i] = 1    ;start of ramp down else
                               ;continuation of ramp down
    }
End Do
START = location of last RampUp[j] == 1
Locate corresponding ramp down: ;first RampDown[j] == 1
    j = START + 1
    if a Ramp Down is not found, END = START
        else
        END = location of the Ramp Down
    SIZE = END - START
    RampUp[START] = 0, RampDown[END] = 0
    RampDown[k] = 0, k = END to the last column
    Goto Locate step Until all pairs have been found
    End when RU has no position with a value of 1
```

The above process is then carried out for all rows in the region of interest, substituting the word "row" for "column".

Referring to FIG. 5A, at step S110, the ramp up and ramp down arrays RU(N) and RD(N) are initialized to 0. At step S120, the threshold T is initialized to $\sqrt{(\sigma(ROI))}$. The steps beginning at step S130 are performed in a loop for every column in the target gate (region of interest).

At step S130, it is determined whether or not I(i,j) is greater than I(i,j−1)+T. That is, it is determined whether the current pixel has an intensity which is greater than the intensity of the last pixel plus the threshold. If the test at step S130 finds that I(i,j)>I(i,j−1)+T, it is necessary to determine whether that pixel is the start of the ramp up (hill) or a continuation of a previously started ramp up. If the current pixel is the start of the ramp up, the previous RU(i), that is, RU(i−1), will be 0, otherwise it will be 1. So at step S140, it is determined whether RU(i−1)=0 indicating the start of a ramp up; if so, RD(i) is set to 1 (step S150 ), otherwise it is assumed that the ramp up continues and RD(i) is left as 0.

At step S210 (FIG. 5B), it is determined whether or not I(i,j) is less than I(i,j 1)−T. That is, it is determined whether the current pixel has an intensity which is less than the intensity of the next pixel minus the threshold. If the test at step S210 finds that I(i,j)<I(j−1)−T, it is again necessary to determine whether that pixel is the start of the ramp down (valley) or a continuation of a previously started ramp down. If the current pixel is the start of the ramp down, the previous RU(i), that is, RU(i−1), will be 0, otherwise it will be 1. So at step S220, it is determined whether RU(i−1)=0 thus indicating the start of a ramp down; if so, RD(i) is set to 1 (step S230 ), otherwise it is assumed that the previously started ramp down continues and RD(i) is left as 0.

The steps shown in FIG. 5B to locate the ramp down positions (steps S210, S220, S230, and S240) can also be implemented using the following alternative pseudo code description, (not shown in the figures).

```
If(I(i,j) < (I(i,j−1)−Threshold)) {
        RampDown[i] = 1    ;start of ramp down
}
```

This alternative approach will detect a single pixel step and will mark it as ramp down. This is different than the previous method which dictates that there must be at least one pixel between pixels marked as ramp downs. This also holds true for the ramp ups.

Referring again to FIG. 5B, step S250 begins a process for locating the last ramp up in the row i, that is, the last RampUp[j] which is equal to 1. Then the START position is set equal to RampUp[j]. Step S260 locates the corresponding ramp down, that is, the first RampDown[j] which is equal to 1. The search starts at START+1. If no ramp down is found to be equal to 1, then the END position is set to START. Otherwise, the END position is set equal to RampDown[j].

At step S270, the signal representing the size of the feature at column/row j is determined by subtracting the START position from the END position. Then RampDown [END] and RampUp[START] are set to 0. At step S280, the rest of the RampDown array is cleared, that is, RampDown [k]=0, for k=END . . . last column/row. The purpose of this step is to eliminate the pairing of a RampUp and RampDown when there exists a paired RampUp and RampDown within their boundaries.

At step S280, if more pairs are found, control returns to step S250. Otherwise, when the RampUp array has no position with a value of 1, the subroutine ends.

Steps S130–S280 are carried out first for the X direction, where the process proceeds across each row by examining each column. Then these steps are repeated for the Y direction by proceeding down the rows in each column. The implementation of the routine in the Y direction is considered within the skill of the ordinary artisan once in possession of the above description and so will not be further described herein.

The algorithm described above will determine the size of hills within the region of interest. The size of the valleys can be determined by either inverting the signals representing the original input image or by conducting the pairing by looking at the RampDown array and finding its pair in the RampUp array.

FIGS. 6A–6I illustrate an example of intensity profiles, and RampUp and RampDown arrays for use in describing a preferred embodiment of the present invention. The first example demonstrates the intensity profile analysis of a very simple scenario. FIG. 6A shows the intensity values of the row to be tested, I(1,j). FIG. 6B shows the results which are obtained by applying steps 110 through 240 of FIGS. 5A and 5B to the example shown in FIG. 6A. The size of the region is equal to 4.

FIGS. 6D–6F show the results for a more involved case. RampUp[2 ] and RampDown[5 ] are paired, and RampUp[7 ] is paired with RampDown[11 ]. Two regions of size 3 and 4 pixels were located. FIGS. 6G–6I show the results for a case where not all of the RampUp positions are paired with corresponding RampDown positions. Only RampUp[7 ] and RampDown[9 ] are paired. RampUp[2 ] and RampDown[12 ] are not paired because a set of paired points exist within their boundaries. Hence, only one region of size 3 was located.

Figure 7A:
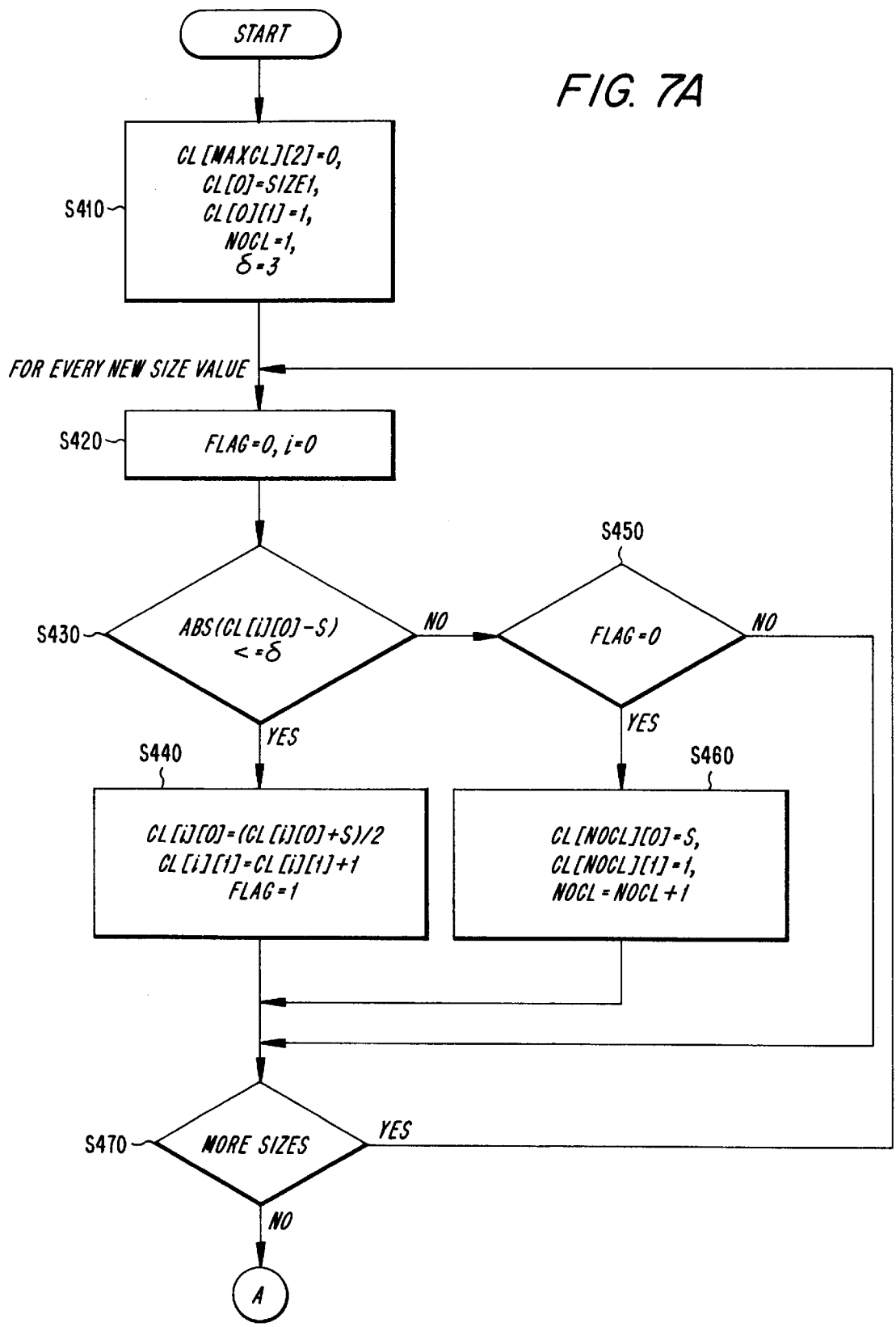
FIGS. 7A–7B are flowcharts showing the cluster analysis subroutine according to a preferred embodiment of the present invention.
Figure 7B:
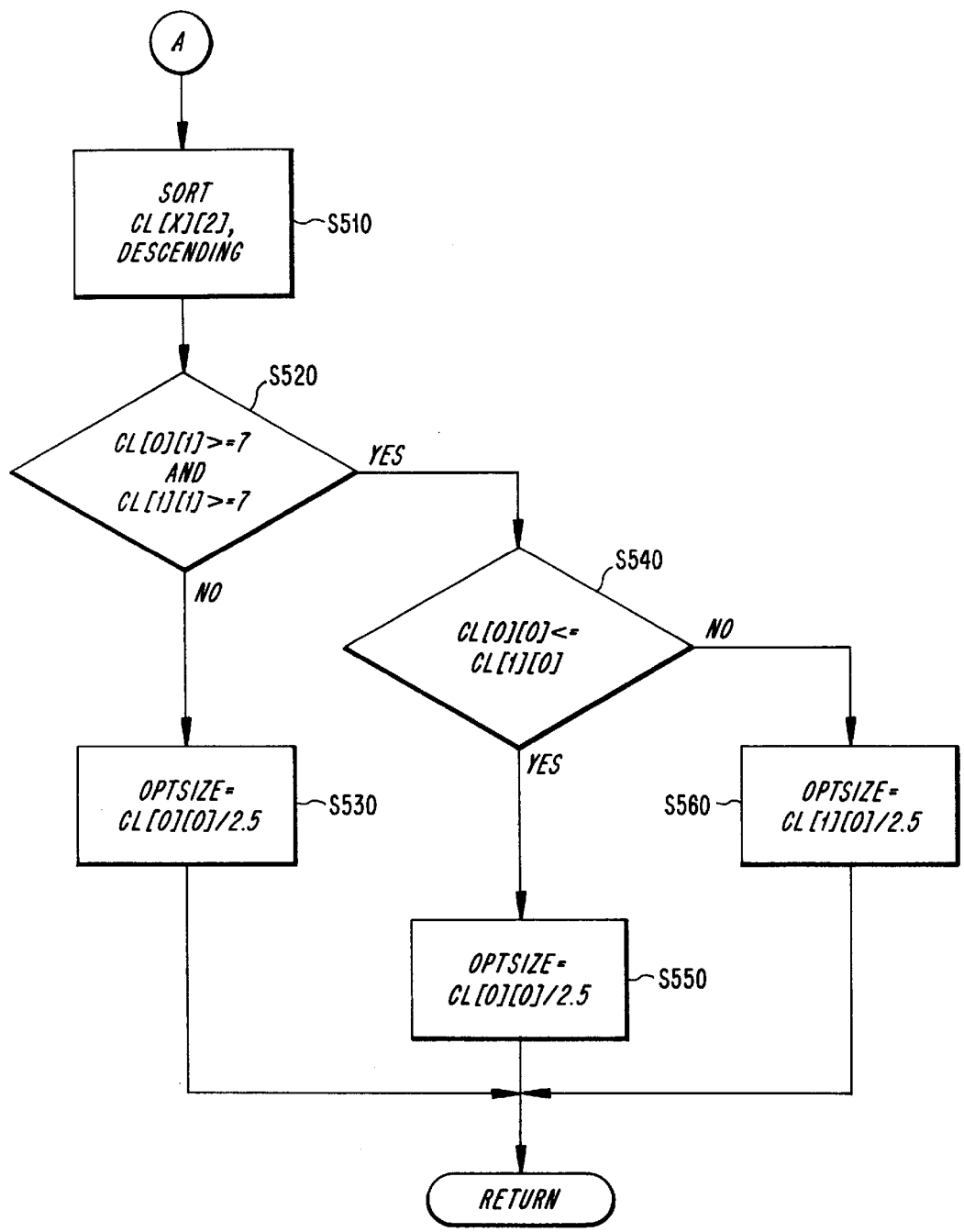

FIGS. 7A–7B are flowcharts showing the cluster analysis subroutine S30 according to a preferred embodiment of the present invention. Cluster analysis is performed on all of the signals representing size values determined by the profile analysis routine to determine the most frequently occurring size. The technique of cluster analysis, per se, can be found, for example, in "Pattern Recognition Principles", J. T. Tou et al., Addison-Wesley Publ. Corp., 1974, chapter 3.3, incorporated by reference herein. However, the use of this known technique in determining the optimal size for the image being viewed is one feature of a preferred embodiment of the present invention.

The following is a pseudo code description of the cluster analysis subroutine.

```
CL[MAXCL][2] = 0
CL[0][0] = first SIZE value
CL[0][1] = 1
NOCL = 1
δ = 3
Do for every new size value:
    Flag = 0
    For (i=0;i<=NOCL;i++) {
        If (absolute value (CL[i][0] − SIZE) <= δ) {
            CL[i][0] = (CL[i][0] + SIZE)/2.0
            CL[i][1]++
            Flag = 1
            break      ;get out of loop
        }
    }
    If (Flag = = 0)          { ;make new cluster point
        CL[NOCL][0] = SIZE
        CL[NOCL][1] = 1
        NOCL++
        }
End do
Sort CL[x][2] array, descending,
    keyed on number of members in clusters
If (CL[0][1] >= 7 and CL[1][1] >= 7) {
    If (CL[0][0] <= CL[1][0])
        OptimalSize = CL[0][0]/2.5
    Else
        OptimalSize = CL[1][0]/2.5
} else
OptimalSize = CL[0][0]/2.5
```

At step S410, initialization of the cluster arrays is performed. For purposes of this description, MAXCL is the maximum number of clusters which can occur. The value of MAXCL can be set as desired to prevent an error condition in the routine. In a preferred embodiment, MAXCL is set to 100. The cluster array, CL[MAXCL][2], is set to 0. CL[X] [0] is the average size of the elements which make up cluster X; CL[X][1] is the number of members in cluster X. In other words, CL[X][0] is calculated for each cluster X by summing the signals representing the size values for each hill and/or valley found to be within the cluster and dividing by the number of such hills and/or valleys.

CL[0][0] is initialized to the first SIZE value returned from the intensity profile analysis routine. CL[0][1] and NOCL are initialized to 1, where NOCL is the number of clusters counter. Delta δ is the allowable distribution for a cluster point, that is, the allowable size surrounding the central cluster point which will be identified as belonging to that central cluster point. According to a preferred embodiment, δ is set to 3.

Steps S420 through S470 are performed for every new SIZE value. At step S420, a flag identifying whether a new cluster point should be defined is set to 0. Also, the counter i is set to 0.

At step S430, it is determined whether or not the absolute value of the cluster size, minus the current SIZE value, is less than or equal to δ. If the answer is yes, step S440 is executed. The cluster size in the cluster array is set to the cluster size plus SIZE, the total divided by 2.0 to calculate a running average of the size values. The number of members in cluster i is incremented and the flag is set to 1.

If the answer at step S430 is no, step S450 is executed to determine whether a new cluster point should be made. If the answer is yes, step S460 is executed. At step S460, the cluster point is defined in the array (CL[NOCL][0]=SIZE) and the number of elements in the newly defined cluster is set to 1 (CL[NOCL][1]=1). Then the number of clusters, NOCL, is incremented.

After either step S440 or step S460 is executed, or if the answer at step S450 is no, step S470 is executed to determine whether there are more SIZE values to be analyzed. If yes, control returns to step S420. If not, control passes to step S510 shown in FIG. 4B.

At step S510, the CL[x][2] array is sorted in descending order, based on the number of members in each cluster. Steps S520 through S560 are executed to obtain the optimal size value (OPTSIZE) to be used in selecting the optimal filter for the image. The optimal filter is, as is noted above, the filter which will produce a filtered image with a high signal-to-noise ratio and stable features, based on the composition of the region of interest being analyzed.

At step S520, it is determined whether the number of elements in the first cluster in the array (CL[0][1]) is greater than or equal to a predetermined number and the number of elements in the second cluster (CL[1][1]) is greater than or equal to the predetermined number. According to one embodiment, this predetermined number is 7, though it may be more or less than 7 as desired. If the answer is no, then the optimal size is set to be the size of the first cluster (CL[0][0]) divided by 2.5 (step S530 ). If the answer at step S520 is yes, it is determined at step S540, whether the size of the first cluster point (CL[0][0]) is less than or equal to the size of the second cluster point (CL[1][0]). If so, the optimal size is set to the size of the first cluster point (CL[0][0]) divided by 2.5 (step S550 ). Otherwise, the optimal size is set to the size of the second cluster point (CL[1][0]) divided by 2.5 (step S560 ).

According to a preferred embodiment, this portion of the routine chooses the second highest cluster size if and only if the number of members in the top two clusters is greater than one less than the predetermined number, for example, 6, and the second cluster size is smaller than the cluster size of the first (top) cluster. If this is not the case, the size associated with the top cluster is chosen as the optimal size.

Figure 8:
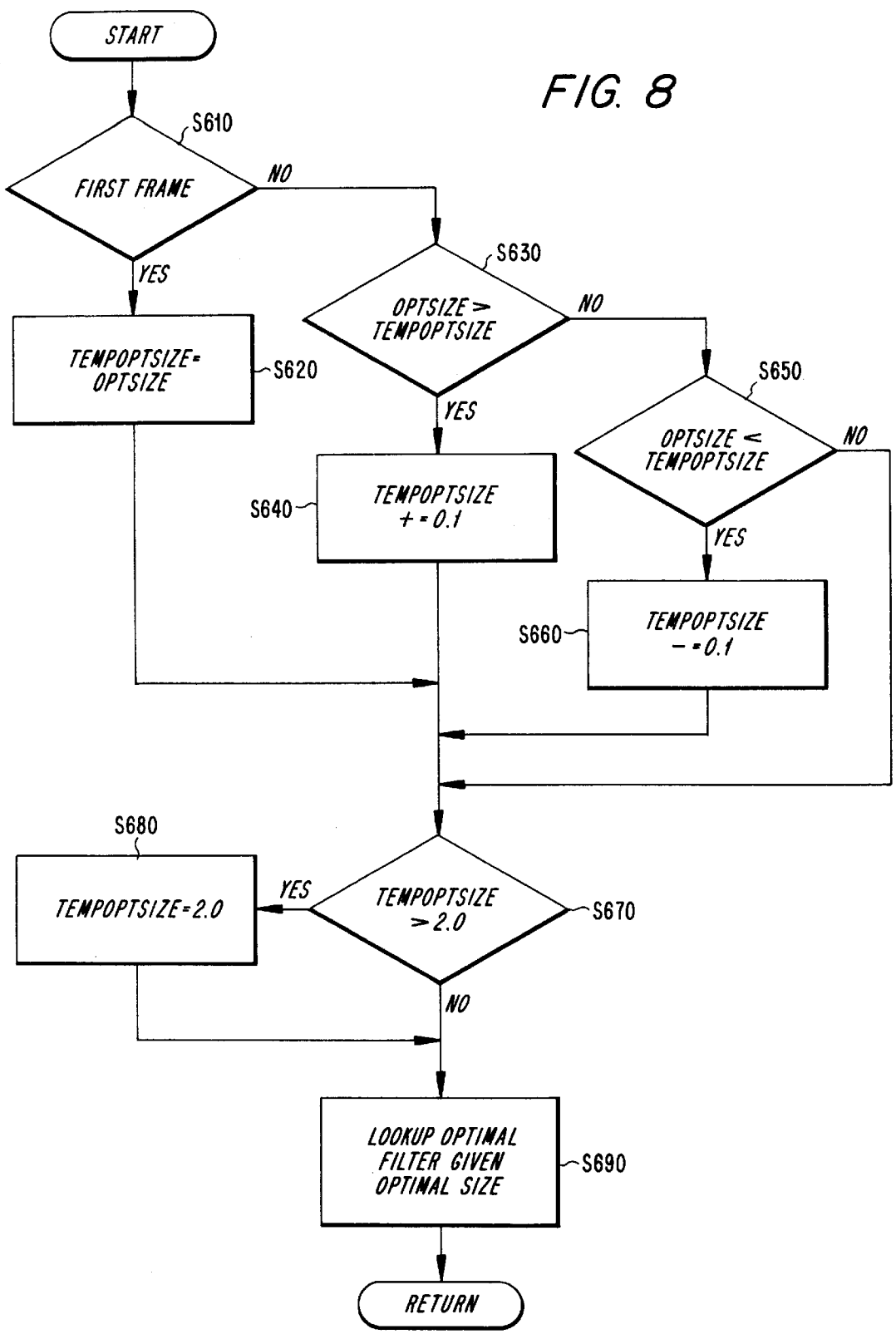
FIG. 8 is a flowchart showing the optimal filter selection subroutine according to a preferred embodiment of the present invention.

FIG. 8 is a flowchart showing the optimal filter selection subroutine according to a preferred embodiment of the present invention. The following is a pseudo code description of the method shown in FIG. 8.

```
If (first frame)
    TemporalOptimalSize = OptimalSize
else {
    If (OptimalSize > TemporalOptimalSize)
        TemporalOptimalSize += 0.1
    else
        If (OptimalSize < TemporalOptimalSize)
            TemporalOptimalSize -= 0.1
}
If (TemporalOptimalSize > 2.0)
    TemporalOptimalSize = 2.0
```

According to a preferred embodiment, since the optimal size is calculated for every frame, the optimal size is temporally filtered on a frame to frame basis. This assures that there is no sudden drastic change in the optimal size from one frame to the next. The temporally filtered size can only change by a value of 0.1 in either direction. Furthermore, the maximum allowable size is 2.0. The temporal filtering technique according to a preferred embodiment is shown in FIG. 8 (and the above pseudo code description).

At step S610, it is determined whether the current frame is the first frame. If so, then the temporal optimal size, TEMPOPTSIZE, is set to the optimal size, OPTSIZE (step S620). If it is not the first frame and the optimal size is greater than the temporal optimal size (step S630), the temporal optimal size is increased by 0.1 (step S640). If the optimal size is less than the temporal optimal size (step S650), the temporal optimal size is decreased by 0.1 (step S660).

Regardless of which step is executed, step S620, S640, or S660, it is next determined whether the temporal optimal size is greater than 2.0 (step S670). If so, the temporal optimal size is set to 2.0 (step S680), that being the maximum allowable size.

Finally, at step S690, a lookup operation is performed to determine the optimal binomial band pass filter to use, given the temporal optimal size. According to a preferred embodiment of the invention, Table 4 is utilized in this lookup operation.

TABLE 4

| TEMPORAL OPTIMAL FILTER | BBP |
| --- | --- |
| 1.0–1.1 | 2,4 |
| 1.2 | 4,6 |
| 1.3 | 4,8 |
| 1.4 | 4,10 |
| 1.5 | 6,12 |
| 1.6 | 6,14 |
| 1.7 | 6,16 |
| 1.8 | 8,18 |
| 1.9–2.0 | 8,20 |

According to a preferred embodiment of the invention, a binomial band pass filter of order (x,y) is denoted by:

$$BBP_{x,y} = BLP_x[\text{InputImage}] - BLP_y[\text{InputImage}] \quad (1)$$

The $BLP_x$ is obtained by cascading a series of $BLP_2$ filters and running the input image through them. For example, $BLP_4$ is achieved by convolving the input image with $BLP_2$ and convolving the result with $BLP_2$. This is illustrated in FIG. 9A. FIG. 9B illustrates the $BLP_8$ filter. The selected optimal binomial band pass filter is then applied to the signals representing the original image to obtain the optimally filtered image having stable features which can be tracked.

If no features are found in a particular region of interest, and if a previous region of interest was analyzed so as to result in the selection of an optimal filter, that previously selected optimal filter is used for the region of interest in which no features were found. If there was no previously selected optimal filter, for example, where the first region of interest scanned after the tracker apparatus according to the present invention is turned on, an error is signalled and the tracker is moved to a new region of interest.

The adaptive filtering method described above was tested in the MTSnr (Minimum Trackable Snr) Analysis Tool using the version of the Tracker Simulator which incorporates the present invention. The MTSnr tool automatically measures the SNR performance of the tracker against a variety of target and noise characteristics. A significant improvement in performance is achieved with the Adaptive Filtering method for the MTT targets.

The adaptive filtering method has been integrated into the Tracker Simulation and tested against the version of the Tracker Simulator that utilized two fixed filter sizes for feature extraction. A total of eleven sequences were tested with the inventive method. The sequences range from moving to stationary targets, bland to detailed targets, and low clutter to dirty battlefield conditions. The present invention demonstrated significant improvement over conventional trackers in tracking objects in these stressful condition sequences. On the remaining sequences, the inventive method results were equivalent to the known tracker, however, more stable features were extracted with the adaptive filtering method.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology of terminology employed herein is for the purpose of description and not of limitation.

What is claimed is:

1. A method of analyzing a region of interest in an original image having at least one feature to extract at least one robust feature, comprising the steps of:

passing signals representing the original image through a first filter to obtain signals representing a smoothed image;

performing a profile analysis on the signals representing the smoothed image to determine a signal representing a size value for any feature in the original image;

performing an analysis on the signals representing the size values determined by the profile analysis to determine a signal representing a most frequently occurring size value;

selecting an optimal filter based on the determined signal representing the most frequently occurring size value; and passing the signals representing the original image through the optimal filter to obtain signals representing an optimally filtered image having an optimally high signal-to-noise ratio.

2. The method of claim 1, wherein the first filter is a second order binomial low pass filter.

3. The method of claim 1, wherein the signals representing the smoothed image include pixels and the step of performing a profile analysis comprises performing, for every column and row of pixels in the region of interest in the signals representing the smoothed image, the steps of:

identifying a starting point for a feature in the region of interest;

identifying an ending point for a feature in the region of interest;

pairing said identified starting point with said identified ending point; and determining the size value of each feature by subtracting a position of the paired starting point from a position of the paired ending point.

4. The method of claim 3, wherein the step of identifying a starting point comprises examining an intensity value for each pixel in the region of interest in succession and wherein a starting point is identified to be a pixel in the signals representing the smoothed image where the intensity of the pixel is greater than the intensity of an immediately previous pixel plus a predetermined threshold and the immediately previous pixel was not identified as a starting point.

5. The method of claim 4, wherein the step of identifying an ending point comprises examining an intensity value for each pixel in the region of interest in succession and wherein an ending point is identified to be a pixel in the signals representing the smoothed image where the intensity of the pixel is less than the intensity of an immediately previous pixel minus a predetermined threshold and the immediately previous pixel was not identified as an ending point.

6. The method of claim 1, wherein the step of performing the analysis on the signals representing the size values comprises the steps of:

determining an average size value for each cluster in the region of interest and a number of members in each cluster;

if the clusters having the largest and second largest number of members have less than a predetermined number of members, setting an optimal size equal to the average size value of the cluster having the largest number of members divided by 2.5;

if the clusters having the largest and second largest number of members have greater than or equal to the predetermined number of members and the average size value of the cluster having the largest number of members is less than or equal to the average size value of the cluster having the second largest number of members, setting an optimal size equal to the average size value of the cluster having the largest number of members divided by 2.5; and if the clusters having the largest and second largest number of members have greater than or equal to the predetermined number of members and the average size value of the cluster having the largest number of members is greater than the average size value of the cluster having the second largest number of members, setting an optimal size equal to the average size value of the cluster having the second largest number of members divided by 2.5; and outputting the set optimal size as the determined signal representing the most frequently occurring size.

7. An apparatus for analyzing a region of interest in an original image having at least one feature to extract robust features, comprising:

first filter means for filtering signals representing the original image to obtain signals representing a smoothed image;

means for performing an intensity profile analysis on the signals representing the smoothed image to determine signals representing size values for features in the smoothed image;

means for performing an analysis on the signals representing the size values determined by the means for performing a profile analysis to determine a signal representing a most frequently occurring size value; and second filter means for optimally filtering the signals representing the original image based on the determined signal representing the most frequently occurring size value.

8. The apparatus of claim 7, wherein the first filter means comprises a second order binomial low pass filter.

9. The apparatus of claim 7, wherein the means for performing an intensity profile analysis comprises:

means for identifying a starting point for each feature in the region of interest in the signals representing the smoothed image;

means for identifying an ending point for each feature in the region of interest in the signals representing the smoothed image;

means for pairing said identified starting point with said identified ending point; and means for determining the size of each feature by subtracting a position of the paired starting point from a position of the paired ending point.

10. The apparatus of claim 9, wherein the means for identifying a starting point comprises means for examining an intensity value for each pixel in the region of interest in succession and means for indicating whether each pixel, in the signals representing the smoothed image, is a starting point for which it is true that the intensity of the pixel is greater than the intensity of an immediately previous pixel plus a predetermined threshold and the immediately previous pixel was not determined to be a starting point.

11. The apparatus of claim 10, wherein the means for identifying an ending point comprises means for examining an intensity value for each pixel in the region of interest in succession and means for indicating whether each pixel, in the signals representing the smoothed image, is an ending point for which it is true that the intensity of the pixel is less than the intensity of an immediately previous pixel minus a predetermined threshold and the immediately previous pixel was not identified as an ending point.

12. The apparatus of claim 7, wherein the means for performing the analysis on the signals representing the size values comprises:

means for determining an average size value for each cluster in the region of interest in the data set representing the smoothed image and a number of members in each cluster;

means for setting an optimal size as the signal representing the most frequently occurring size value;

wherein the optimal size is set to the average size value of the cluster having the largest number of members divided by 2.5 if the clusters having the largest and second largest number of members have less than a predetermined number of members;

the optimal size is set to the average size value of the cluster having the largest number of members divided by 2.5 if the clusters having the largest and second largest number of members have greater than or equal to the predetermined number of members and the average size value of the cluster having the largest number of members is less than or equal to the average size value of the cluster having the second largest number of members; and the optimal size is set to the average size value of the cluster having the second largest number of members divided by 2.5 if the clusters having the largest and second largest number of members have greater than or equal to the predetermined number of members and the average size value of the cluster having the largest number of members is greater than the average size value of the cluster having the second largest number of members.

13. An apparatus for operating a microprocessor means to analyze a region of interest in a video image to extract robust features in the video image, the apparatus comprising:

a first module for filtering the signals representing the video image to obtain signals representing a smoothed image having at least one feature;

a second module for performing a profile analysis on the signals representing the smoothed image to determine a size value for each of the features in smoothed image;

a third module for performing an analysis on the size values determined by the second module to determine the most frequently occurring size value; and a fourth module for optimally filtering the signals representing the original image based on the determined most frequently occurring size.

14. A method of analyzing an image comprising the steps of:

obtaining the image;

obtaining a data set from said image, each of the members of said data set having a value representing intensity of a pixel of said image;

passing said data set through a first filter to obtain a smoothed data set;

performing a profile analysis on the smoothed data set to determine size value for at least one feature in said image;

performing an analysis on the size values determined by the profile analysis to determine a most frequently occurring size; and using the determined most frequently occurring size to select an optimal filter.

15. The method of claim 14, further comprising the step of passing the data set of the image through the optimal filter.

16. The method of claim 14, wherein the step of performing a profile analysis comprises the steps of:

finding respective positions of a starting point and an ending point for at least one feature in the image; and determining a size of said at least one feature by subtracting the positions of said starting point from the position of said associated ending point.

17. The method of claim 14, wherein the step of performing a profile analysis comprises the steps of:

finding positions of starting points in the image;

finding positions of ending points in the image;

identifying features in said the image by pairing at least some of said starting points with a like number of ending points; and determining the size of the identified features by subtracting the position of the starting point of said feature from the position of the ending point of said feature.

18. The method of claim 17, wherein the step of finding a position of a starting point comprises the steps of:

determining values of members of said smoothed data set in a predetermined order; and finding a position of a value in said smoothed data set which differs in magnitude from an immediately prior value by more than a predetermined amount.

19. The method of claim 18, wherein the step of finding a position of a starting point further comprises determining that said adjacent pixel was not identified as a starting point.

20. The method of claim 18, wherein said magnitude is positive.

21. The method of claim 17, wherein the step of finding a position of a starting point comprises the steps of:

determining intensities of pixels in said image in a predetermined order; and finding a position of a pixel in said image having an intensity which differs in magnitude from an intensity of an immediately prior pixel by more than a predetermined amount.

22. The method of claim 17, wherein the step of finding a position of a starting point comprises finding a position of a pixel in said image having an intensity which differs in magnitude from an intensity of an adjacent pixel by more than a predetermined amount.

23. The method of claim 17, wherein the step of finding a position of an ending point comprises the steps of:

determining values of members of said smoothed data set in a predetermined order; and finding a position of a value in said smoothed data set which differs in magnitude from an immediately prior value by more than a predetermined amount.

24. The method of claim 21, wherein the step of finding a position of an ending point further comprises determining that said adjacent pixel was not identified as an ending point.

25. The method of claim 21, wherein said magnitude is negative.

26. The method of claim 17, wherein the step of finding a position of an ending point comprises the steps of:

determining intensities of pixels in said image in a predetermined order; and finding a position of a pixel in said image having an intensity which differs in magnitude from an intensity of an immediately prior pixel by more than a predetermined amount.

* * * * *